United States Patent
Hosur et al.

(10) Patent No.: US 6,917,311 B2
(45) Date of Patent: Jul. 12, 2005

(54) ORTHOGONAL PREAMBLE ENCODER, METHOD OF ENCODING ORTHOGONAL PREAMBLES AND MULTIPLE-INPUT, MULTIPLE-OUTPUT COMMUNICATION SYSTEM EMPLOYING THE SAME

(75) Inventors: Srinath Hosur, Plano, TX (US); Anuj Batra, Dallas, TX (US); Srikanth Gummadi, Rohnert Park, CA (US); David P. Magee, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 43 days.

(21) Appl. No.: 10/639,418

(22) Filed: Aug. 11, 2003

(65) Prior Publication Data

US 2005/0035885 A1 Feb. 17, 2005

(51) Int. Cl.[7] .............................................. H03M 7/00
(52) U.S. Cl. ............................ 341/50; 341/51; 375/347
(58) Field of Search .............................. 341/50, 51, 52, 341/59, 63; 455/276.1, 63.1, 63.4, 69, 67.11, 506, 423, 25; 370/208, 503, 343, 480; 375/347, 295, 383, 148

(56) References Cited

U.S. PATENT DOCUMENTS

| | | | | |
|---|---|---|---|---|
| 6,473,467 B1 | * | 10/2002 | Wallace et al. | 375/267 |
| 6,549,583 B2 | * | 4/2003 | Crawford | 375/260 |
| 6,687,492 B1 | * | 2/2004 | Sugar et al. | 455/276.1 |
| 6,754,170 B1 | * | 6/2004 | Ward | 370/208 |
| 6,798,736 B1 | * | 9/2004 | Black et al. | 370/208 |
| 6,865,174 B1 | * | 3/2005 | Tsubouchi et al. | 370/342 |

* cited by examiner

*Primary Examiner*—Brian Young
(74) *Attorney, Agent, or Firm*—Abdul Zindani; W. James Brady, III; Frederick J. Telecky, Jr.

(57) ABSTRACT

For use with a multiple-input, multiple-output (MIMO) transmitter, an orthogonal preamble encoder, a method of encoding orthogonal preambles and a communication system incorporating the encoder or the method. In one embodiment, the encoder includes: (1) a preamble supplement generator configured to provide a first long sequence preamble supplement to a first transmit antenna of the MIMO transmitter and (2) a preamble supplement coordinator coupled to the preamble supplement generator and configured to provide a second long sequence preamble supplement to a second transmit antenna of the MIMO transmitter, at least a portion of the second long sequence preamble supplement being a negation of the first long sequence preamble supplement.

21 Claims, 3 Drawing Sheets

US 6,917,311 B2

ORTHOGONAL PREAMBLE ENCODER, METHOD OF ENCODING ORTHOGONAL PREAMBLES AND MULTIPLE-INPUT, MULTIPLE-OUTPUT COMMUNICATION SYSTEM EMPLOYING THE SAME

TECHNICAL FIELD OF THE INVENTION

The present invention is directed, in general, to a communication system and, more specifically, to an orthogonal preamble encoder, a method of encoding orthogonal preambles and a multiple-input, multiple-output (MIMO) transmitter employing the encoder and method. The encoder and method employ orthogonal preambles for channel estimation.

BACKGROUND OF THE INVENTION

Multiple-input multiple output (MIMO) communication systems have been shown to provide improvements in capacity and reliability over single-input single-output (SISO) communication systems. The MIMO communication systems commonly employ a block structure wherein a MIMO transmitter (which is a cooperating collection of single-dimension transmitters) sends a vector of symbol information. This symbol vector may represent one or more coded or uncoded SISO data symbols. A MIMO receiver (which is a cooperating collection of single-dimension receivers) receives one or more copies of this transmitted vector of symbol information. The performance of the entire communication system hinges on the ability of the receiver to find reliable estimates of the symbol vector that the transmitter transmitted.

Several standards have been established to provide uniformity and support growth in the development of wireless networks. One such standard that has been promulgated by the Institute of Electrical and Electronic Engineers (IEEE) is IEEE 802.11, which is incorporated herein by reference in its entirety. IEEE 802.11 is an umbrella standard that encompasses a family of specifications pertaining to wireless communication. Generally, IEEE 802.11 specifies an over-the-air interface between a wireless client and a base station or between two wireless clients.

There are several specifications within the IEEE 802.11 family covering topics such as different transmission rates, encoding schemes and frequency bands for transmitting data wirelessly. For example, IEEE 802.11(a) is an extension of IEEE 802.11 that specifically addresses wireless local area networks (WLANs) having a data rate up to 54 Mbps and employing a carrier frequency of 2.4/5 GHz. IEEE 802.11(a) specifies for such WLANs an orthogonal frequency division multiplexing (OFDM) encoding scheme for the vectors of symbol information.

A 2×2 MIMO communication system conforming to the IEEE 802.11(a) standard may transmit two independent and concurrent signals, employing two single-dimension transmitters having separate transmit antennas and two single-dimension receivers having separate receive antennas. Alternatively, the antennas could be derived from a single physical antenna that appropriately employs polarization. Two receive signals $Y1(k)$, $Y2(k)$ on the $k^{th}$ sub-carrier following a Fast Fourier Transformation and assuming negligible inter-symbol interference may be written as:

$$Y1(k)=H11(k)*X1(k)+H12(k)*X2(k)+n1(k)$$

$$Y2(k)=H21(k)*X1(k)+H22(k)*X2(k)+n2(k)$$

where $X1(k)$ and $X2(k)$ are two independent signals transmitted on the $k^{th}$ sub-carrier from the first and second transmit antennas, respectively, and n1 and n2 are noises associated with the two receive signals. The term Hij(k), where i=1, 2 and j=1, 2, incorporates gain and phase distortion associated with symbols transmitted on the $k^{th}$ sub-carrier from transmit antenna j to receive antenna i. The channel gain and phase terms Hij(k) may also include gain and phase distortions due to signal conditioning stages such as filters and other analog electronics. The receiver requires that the channel values Hij(k) reliably decode the transmitted signals $X1(k)$ and $X2(k)$.

In order to estimate the channel coefficients Hij(k) at the receiver, the transmitter and the receiver employ training sequences. These training sequences are predetermined and known at both the transmitter and the receiver. In IEEE 802.11(a), a long training sequence is employed as part of a preamble to the transmission of data. This long sequence involves the transmission of a known sequence of vector symbols, employing 52 excited tones (1 or −1) and an unexcited tone (0) both at DC and at each end of the spectrum, to provide a guard interval that is used to reduce inter-symbol interference. An appropriate calculation of individual channel estimates H11($k$), H12($k$), H21($k$), H22($k$) may typically require a processor employing complex calculations. Therefore, a trade-off usually exists in achieving a reliable channel estimate between the quality of channel estimation and the cost related to computational complexity. What is needed in the art is a way to enhance quality of channel estimation while reducing computational complexity.

SUMMARY OF THE INVENTION

To address the above-discussed deficiencies of the prior art, the present invention, for use with a MIMO transmitter, is directed to an orthogonal preamble encoder and a method of encoding orthogonal preambles. In one embodiment, the orthogonal preamble encoder includes: (1) a preamble supplement generator configured to provide a first long sequence preamble supplement to a first transmit antenna of the MIMO transmitter and (2) a preamble supplement coordinator coupled to the preamble supplement generator and configured to provide a second long sequence preamble supplement to a second transmit antenna of the MIMO transmitter, at least a portion of the second long sequence preamble supplement being a negation of the first long sequence preamble supplement.

In another aspect, the present invention provides a method of encoding orthogonal preambles for use with a MIMO transmitter that includes: (1) providing a first long sequence preamble supplement to a first transmit antenna of the MIMO transmitter and (2) providing a second long sequence preamble supplement to a second transmit antenna of the MIMO transmitter, at least a portion of the second long sequence preamble supplement being a negation of the first long sequence preamble supplement.

The present invention also provides, in yet another aspect, a MIMO communication system that includes: (1) first and second transmitters employing first and second transmit antennas, respectively, (2) an orthogonal preamble encoder, including: (2a) a preamble supplement generator that provides a first long sequence preamble supplement to the first transmit antenna and (2b) a preamble supplement coordinator coupled to the preamble supplement generator that provides a second long sequence preamble supplement to the second transmit antenna, at least a portion of the second long sequence preamble supplement being a negation of the first long sequence preamble supplement and (3) first and second receivers, associated with the first and second transmitters, that employ first and second receive antennas, respectively.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
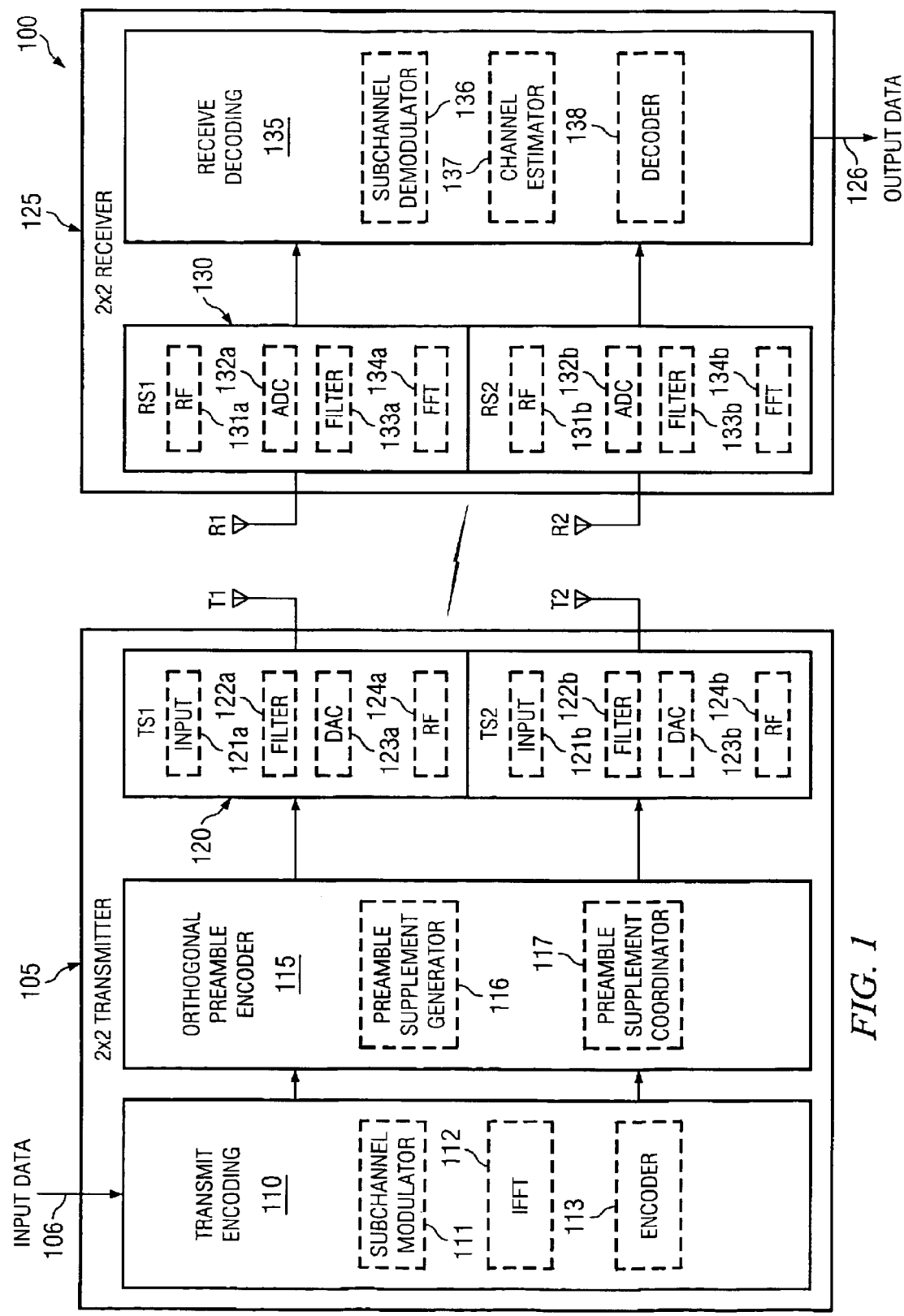
FIG. 1 illustrates a system diagram of an embodiment of a 2×2 MIMO communication system constructed in accordance with the principles of the present invention.

Referring initially to FIG. 1, illustrated is a system diagram of an embodiment of a 2×2 MIMO communication system, generally designated 100, constructed in accordance with the principles of the present invention. In the illustrated embodiment, the MIMO communication system 100 operates in an OFDM mode wherein the OFDM portion may be employed with the IEEE 802.11(a) and the IEEE 802.11(g) standards. The MIMO communication system 100 includes a transmitter 105 and a receiver 125.

The transmitter 105 includes input data 106, a transmit encoding system 110, an orthogonal preamble encoder 115 and a transmit system 120 having first and second transmit sections TS1, TS2 coupled to first and second transmit antennas T1, T2, respectively. The MIMO receiver 125 includes a receive system 130 having first and second receive sections RS1, RS2 respectively coupled to first and second receive antennas R1, R2, and a receive decoding system 135 providing output data 126.

The transmit encoding system 110 includes a subchannel modulator 111, an Inverse Fast Fourier Transform (IFFT) section 112 and an encoder 113. The subchannel modulator 111, IFFT section 112 and encoder 113 prepare the input data and support the arrangement of preamble information and signal fields for transmission by the transmit system 120. The preamble information provides a training sequence for the MIMO receiver 125 that allows establishing a communication channel estimate, which is needed to process the transmission.

The orthogonal preamble encoder 115 includes a preamble supplement generator 116 and a preamble supplement coordinator 117, which cooperate with the encoder 113 to provide first and second long sequence preamble supplements for transmission by the transmit system 120. The first and second long sequence preamble supplements provide additional communication channel estimates that facilitate channel estimation. In the illustrated embodiment, the first long sequence preamble supplement is provided to the first transmit section TS1 and the second long sequence preamble supplement is provided to the second transmit section TS2 for substantially concurrent transmission thereby. The first and second long sequence preamble supplements may employ additional long sequences or modify at least one existing long sequence.

The first and second transmit sections TS1, TS2 include first and second input sections 121a, 121b, first and second filters 122a, 122b, first and second digital to analog converters (DACs) 123a, 123b and first and second RF sections 124a, 124b, respectively. The first and second transmit sections TS1, TS2 provide a time domain RF signal proportional to the preamble, signal fields and input data for transmission by the first and second transmit antennas T1, T2, respectively.

The first and second receive antennas R1, R2 receive the transmission and provide it to the first and second receive sections RS1, RS2, which include first and second RF sections 131a, 131b, first and second analog to digital converters (ADCs) 132a, 132b, first and second filters 133a, 133b, and first and second Fast Fourier Transform (FFT) sections 134a, 134b, respectively. The first and second receive sections RS1, RS2 provide a frequency domain digital signal, proportional to the preamble and preamble supplements, signal fields and input data, to the receive decoding system 135. The receive decoding system 135 includes a subchannel demodulator 136, a channel estimator 137 and a decoder 138 that employ the preamble, preamble supplements, signal fields and input data to provide the output data. In the illustrated embodiment, the channel estimator 137 also employs the preamble and preamble supplements for the purpose of channel estimation.

The orthogonal preamble encoder 115 employs the preamble supplement generator 116 to provide a first long sequence preamble supplement to the first transmit antenna T1 for transmission. Additionally, the preamble supplement coordinator 117, which is coupled to the preamble supplement generator 116, provides a second long sequence preamble supplement to the second transmit antenna T2 for transmission. At least a portion of the second long sequence preamble supplement is a negation of the first long sequence preamble supplement thereby creating orthogonality between the first and second long sequence preamble supplements. Generally, the first and second long sequence preamble supplements may be employed in either the frequency or time domain. For the time domain, an IFFT of the appropriate long sequence preamble supplement may be pre-computed and read from memory at the required transmission time.

Currently, two standard long sequences (i.e., long training sequences) are employed as part of a standard preamble transmission by each of the first and second transmit sections TS1, TS2 to establish an estimate of the communication channel. This channel estimate is needed at the receiver to reliably re-establish first and second independent transmit signals $X1(k)$, $X2(k)$. As indicated earlier, first and second receive signals $Y1(k)$, $Y2(k)$ may be written as:

$$Y1(k)=H11(k)*X1(k)+H12(k)*X2(k) \tag{1a}$$

$$Y2(k)=H21(k)*X1(k)+H22(k)*X2(k) \tag{1b}$$

where k is the sub-carrier/tone index, and the associated noise terms have been assumed negligible, for simplicity. Since the first and second independent transmit signals X2(k), X1(k) are equal, it follows from equations (1a) and (1b) that the first and second receive signals Y1(k), Y2(k) on the first and second receive antennas R1, R2 for the $k^{th}$ sub-carrier index may be rewritten as $$Y1(k)=(H11(k)+H12(k))*X1(k) \tag{1c}$$

$$Y2(k)=(H21(k)+H22(k))*X2(k) \tag{1d}$$

The quantities (H11(k)+H12(k)) and (H21(k)+H22(k)) represent an equivalent channel from the first and second transmit antennas T1, T2 to the first and second receive antennas R1, R2 during the first preamble.

By also transmitting first and second long sequence preamble supplements that are orthogonal, supplemental receive signals Y1s(k), Y2s(k) may be written as:

$$Y1s(k)=H11(k)*X1s(k)-H12(k)*X2s(k) \tag{2a}$$

$$Y2s(k)=H21(k)*X1s(k)-H22(k)*X2s(k) \tag{2b}$$

Since X2s(k) equals −X1s(k), it follows from equations 2(a) and 2(b) that the supplemental receive signals Y1s(k), Y2s(k) on first and second antennas R1, R2 for the $k^{th}$ sub-carrier can be rewritten as $$Y1s(k)=(H11(k)-H12(k))*X1s(k) \tag{2c}$$

$$Y2s(k)=(H21(k)-H22(k))*X2s(k) \tag{2d}$$

The quantities H11(k)−H12(k) and H21(k)−H22(k) represent an equivalent channel from the first and second transmit antennas T1, T2 to the first and second receive antennas R1, R2 for the preamble supplement.

Then, addition and subtraction of the standard and supplemental first communication channel responses and the standard and supplemental second communication channel responses leads to the individual channel estimates H11(k), H12(k), H21(k), H22(k), thereby avoiding the need for complex calculations. The first long sequence preamble supplement may be the same as the standard long sequence employed in the standard preamble transmission. Alternatively, The first long sequence preamble supplement may be different from the standard long sequence as may be dictated by a particular application. Of course, the second long sequence preamble supplement is the negation of the first long sequence preamble supplement, in any case.

Those skilled in the art will understand that the present invention can be applied to other conventional and future-discovered MIMO communication systems. These systems may form a part of a selected one of a narrowband wireless communication system employing multiple antennas, a broadband communication system employing time division multiple access (TDMA) or a general multiuser communication system.

Figure 2:
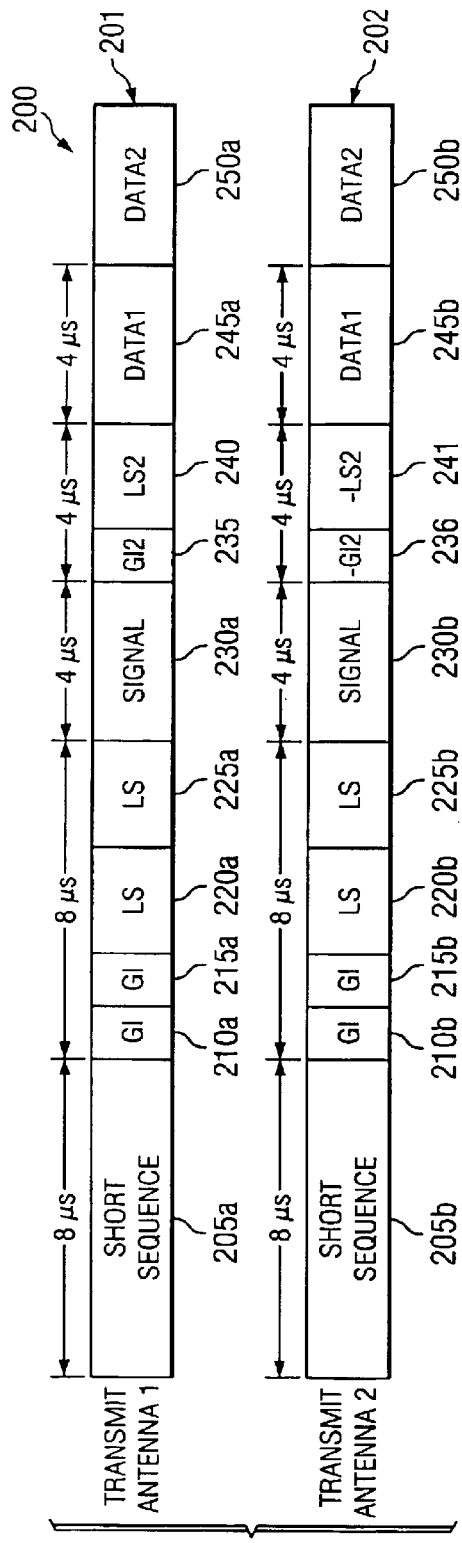
FIG. 2 illustrates a diagram of an embodiment of a transmission frame format employable with an orthogonal preamble encoder and constructed in accordance with the principles of the present invention.

Turning now to FIG. 2, illustrated is a diagram of an embodiment of a transmission frame format, generally designated 200, employable with an orthogonal preamble encoder and constructed in accordance with the principles of the present invention. The transmission frame format 200 may be employed with first and second MIMO transmitters as discussed with respect to FIG. 1 and includes first and second transmission frames 201, 202 associated with first and second MIMO transmit antennas, respectively.

The first and second transmission frames 201, 202 employ several standard fields that are common to both including standard preambles having short sequences 205a, 205b, first and second guard intervals 210a, 210b, 215a, 215b and first and second long sequences 220a, 220b, 225a, 225b, respectively. Additional standard fields common to both include standard signal fields 230a, 230b, and portions of a transmit payload containing data fields 245a, 245b, 250a, 250b. The first and second transmission frames 201, 202 also include first and second long sequence preamble supplements employing first and second additional guard intervals 235, 236 and first and second additional long sequences 240, 241, respectively.

In the illustrated embodiment, the first additional long sequence 240 is the same as any of the first and second long sequences 220a, 220b, 225a, 225b. In the frequency domain, the first additional long sequence 240 may be represented as:

$$X[k]=\{0, 0, 0, 0, 0, 0, 1, 1, -1, -1, 1, -1, 1, -1, 1, 1, 1, 1, 1, 1,\\ -1, -1, 1, 1, -1, 1, -1, 1, 1, 1, 1, 0, 1, -1, -1, 1, 1, -1, 1, -1,\\ 1, -1, -1, -1, -1, -1, 1, 1, -1, -1, 1, -1, 1, -1, 1, 1, 1, 1, 0,\\ 0, 0, 0, 0\} \tag{3}$$

for −32≦k≦31. Similarly, the second additional guard interval 236 and second additional long sequence 241 may be represented in the frequency domain as:

$$-X[k]=\{0, 0, 0, 0, 0, 0, -1, -1, 1, 1, -1, -1, 1, -1, 1, -1, -1, -1,\\ -1, -1, -1, 1, 1, -1, -1, 1, -1, 1, 1, -1, -1, -1, -1, 0, -1, 1, 1,\\ -1, -1, 1, -1, 1, -1, 1, 1, 1, 1, 1, -1, -1, 1, 1, -1, 1, -1, 1,\\ -1, -1, -1, -1, 0, 0, 0, 0, 0\} \tag{4}$$

for −32≦k≦31.

Equation 4 is the negation of equation 3 thereby making the second additional long sequence 241 orthogonal to the first additional long sequence 240. Additionally, this arrangement maintains backward compatibility but typically increases the overhead associated with the transmission, and therefore, may affect transmission throughput.

Figure 3:
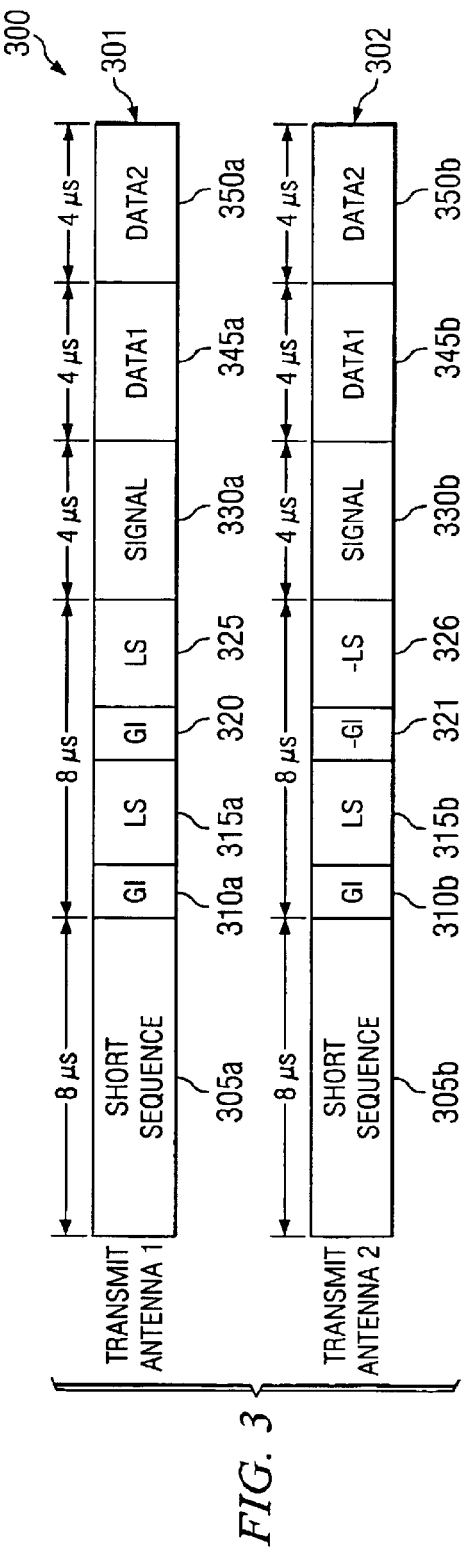
FIG. 3 illustrates a diagram of an alternative embodiment of a transmission frame format employable with an orthogonal preamble encoder and constructed in accordance with the principles of the present invention.

Turning now to FIG. 3, illustrated is a diagram of an alternative embodiment of a transmission frame format, generally designated 300, employable with an orthogonal preamble encoder and constructed in accordance with the principles of the present invention. The transmission frame format 300 may also be employed with first and second MIMO transmitters as discussed with respect to FIG. 1 and includes first and second transmission frames 301, 302 associated with first and second MIMO transmit antennas, respectively.

The first and second transmission frames 301, 302 employ several standard fields that are common to both including short sequences 305a, 305b, first guard intervals 310a, 310b, first long sequences 315a, 315b, signal fields 330a, 330b and portions of a transmit payload containing data fields 345a, 345b, 350a, 350b, respectively. The first and second transmission frames 301, 302 also include first and second long sequence preamble supplements employing first and second modified guard intervals 320, 321 and first and second modified long sequences 325, 326, respectively.

In the illustrated embodiment, the first and second long sequence preamble supplements employ a modified long sequence within the standard preamble. The standard long sequences 315a, 315b produce standard communication responses and the first and second modified long sequences 325, 326 produce supplemental communication responses. Appropriate addition and subtraction of these standard and supplemental communication responses provide individual channel estimates needed to re-establish transmit signals. Additionally, this arrangement does not maintain backward compatibility, typically does not increase the overhead associated with the transmission thereby not affecting transmission throughput.

Figure 4:
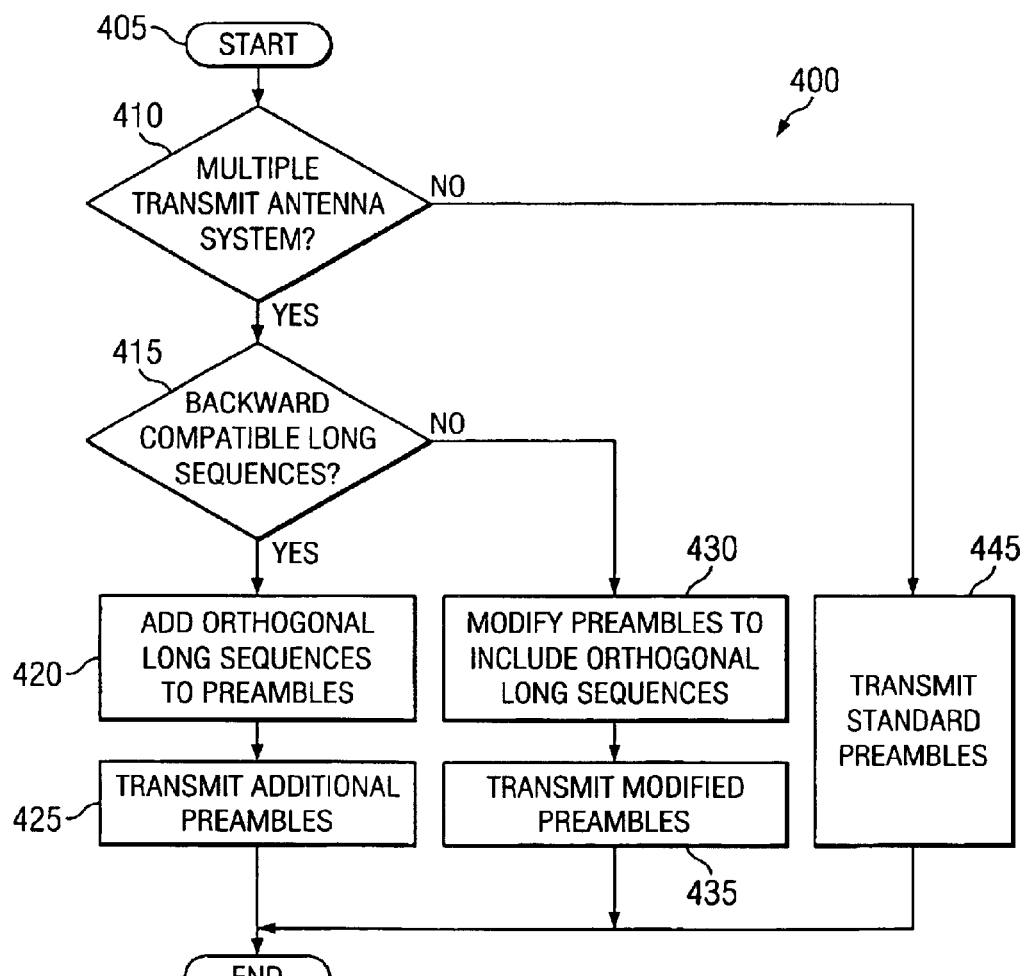
FIG. 4 illustrates a flow diagram of an embodiment of a method of encoding orthogonal preambles carried out in accordance with the principles of the present invention.

Turning now to FIG. 4, illustrated is a flow diagram of an embodiment of a method of encoding orthogonal preambles, generally designated 400, carried out in accordance with the principles of the present invention. The method 400 starts in a step 405 wherein preambles are employed for a MIMO transmitter having a plurality of transmit antennas. A first decisional step 410 determines if the plurality of transmit antennas is being employed for the current transmission. If the plurality of transmit antennas is being employed, a second decisional step 415 determines whether preamble sequences are to maintain backward compatibility. If backward compatibility is to be maintained, orthogonal long sequences are added to the preambles in a step 420 and transmitted in a step 425 employing the plurality of transmit antennas. The method 400 ends in a step 440.

If the second decisional step 415 determines that backward compatibility is not to be maintained, a standard preamble is modified to include orthogonal long sequences in a step 430, and the modified preambles are transmitted employing the plurality of transmit antennas in a step 435. Then, the method 400 ends in the step 440. If the first decisional step 410 determines that a single transmit antenna system is being employed for the current transmission, standard preambles are transmitted in a step 445, and the method 400 ends in the step 440.

While the method disclosed herein has been described and shown with reference to particular steps performed in a particular order, it will be understood that these steps may be combined, subdivided, or reordered to form an equivalent method without departing from the teachings of the present invention. Accordingly, unless specifically indicated herein, the order and/or the grouping of the steps are not limitations of the present invention.

In summary, embodiments of the present invention employing an orthogonal preamble encoder and a method of encoding have been presented. Advantages include a reduction in computational complexity needed to establish a channel estimate for a MIMO receiver. This facility may be accomplished with little or no increase in transmit overhead thereby yielding either a small or negligible impact on transmission throughput.

Although the present invention has been described in detail, those skilled in the art should understand that they can make various changes, substitutions and alterations herein without departing from the spirit and scope of the invention in its broadest form.

What is claimed is:

1. An orthogonal preamble encoder, for use with a multiple-input, multiple-output (MIMO) transmitter, comprising:
   a preamble supplement generator configured to provide a first long sequence preamble supplement to a first transmit antenna of said MIMO transmitter; and
   a preamble supplement coordinator coupled to said preamble supplement generator and configured to provide a second long sequence preamble supplement to a second transmit antenna of said MIMO transmitter, at least a portion of said second long sequence preamble supplement being a negation of said first long sequence preamble supplement.

2. The encoder as recited in claim 1 wherein said first and second long sequence preamble supplements are configured to employ an additional guard interval.

3. The encoder as recited in claim 1 wherein said first and second long sequence preamble supplements are configured to employ an additional long sequence.

4. The encoder as recited in claim 1 wherein said first and second long sequence preamble supplements are configured to employ a modified long sequence.

5. The encoder as recited in claim 1 wherein said first and second long sequence preamble supplements conform to an IEEE 802.11 communication standard.

6. The encoder as recited in claim 1 wherein said first and second long sequence preamble supplements are configured to provide additional communication channel estimates.

7. The encoder as recited in claim 1 wherein said first and second long sequence preamble supplements are configured to be employed with a signal field.

8. A method of encoding orthogonal preambles for use with a multiple-input, multiple-output (MIMO) transmitter, comprising:
   providing a first long sequence preamble supplement to a first transmit antenna of said MIMO transmitter; and
   providing a second long sequence preamble supplement to a second transmit antenna of said MIMO transmitter, at least a portion of said second long sequence preamble supplement being a negation of said first long sequence preamble supplement.

9. The method as recited in claim 8 wherein said providing of said first and second long sequence preamble supplements employ an additional guard interval.

10. The method as recited in claim 8 wherein said providing of said first and second long sequence preamble supplements employ an additional long sequence.

11. The method as recited in claim 8 wherein said providing of said first and second long sequence preamble supplements employ a modified long sequence.

12. The method as recited in claim 8 wherein said providing of said first and second long sequence preamble supplements conform to an IEEE 802.11 communication standard.

13. The method as recited in claim 8 wherein said providing of said first and second long sequence preamble supplements provide additional communication channel estimates.

14. The method as recited in claim 8 wherein said providing of said first and second long sequence preamble supplements are employed with a signal field.

15. A multiple-input, multiple output (MIMO) communication system, comprising:
   first and second transmitters employing first and second transmit antennas, respectively;
   an orthogonal preamble encoder, including:
      a preamble supplement generator that provides a first long sequence preamble supplement to said first transmit antenna, and
      a preamble supplement coordinator coupled to said preamble supplement generator that provides a second long sequence preamble supplement to said second transmit antenna, at least a portion of said second long sequence preamble supplement being a negation of said first long sequence preamble supplement; and
   first and second receivers, associated with said first and second transmitters, that employ first and second receive antennas, respectively.

16. The communication system as recited in claim 15 wherein said first and second long sequence preamble supplements employ an additional guard interval.

17. The communication system as recited in claim 15 wherein said first and second long sequence preamble supplements employ an additional long sequence.

18. The communication system as recited in claim 15 wherein said first and second long sequence preamble supplements employ a modified long sequence.

19. The communication system as recited in claim 15 wherein said first and second long sequence preamble supplements conform to an IEEE 802.11a communication standard.

20. The communication system as recited in claim 15 wherein said first and second long sequence preamble supplements provide additional communication channel estimates.

21. The communication system as recited in claim 15 wherein said first and second long sequence preamble supplements are employed with a signal field.

* * * * *